US012682812B2

(12) United States Patent
Yang et al.

(10) Patent No.: US 12,682,812 B2
(45) Date of Patent: Jul. 14, 2026

(54) METHOD OF CONTROLLING DISPLAY DRIVER TOTAL CHARGING TIME LENGTH OF SUB-PIXELS TO IMPROVE BRIGHT-DARK LINE ISSUES

(71) Applicant: NOVATEK Microelectronics Corp., Hsinchu (TW)

(72) Inventors: Hsuan-Sheng Yang, Hsinchu City (TW); Ching-Wen Hou, Hsinchu City (TW); Yu-Ren Chiu, Taoyuan City (TW); Chi-Ming Lo, Hsinchu County (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 19/008,658

(22) Filed: Jan. 3, 2025

(65) Prior Publication Data

US 2026/0120608 A1 Apr. 30, 2026

Related U.S. Application Data

(60) Provisional application No. 63/713,055, filed on Oct. 29, 2024.

(51) Int. Cl.
*G09G 3/20* (2006.01)

(52) U.S. Cl.
CPC ... *G09G 3/2074* (2013.01); *G09G 2300/0852* (2013.01); *G09G 2310/0275* (2013.01); *G09G 2310/06* (2013.01); *G09G 2310/08* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/325; G09G 3/3258; G09G 3/3266; G09G 3/3275; G09G 3/3283; G09G 3/3291; G09G 3/36; G09G 3/3611; G09G 3/3614; G09G 3/3622;
(Continued)

(56) References Cited

U.S. PATENT DOCUMENTS

2008/0055304 A1* 3/2008 Ryu .................... G09G 3/2022 313/504
2009/0251455 A1* 10/2009 Park .................... G09G 3/2007 345/84

(Continued)

FOREIGN PATENT DOCUMENTS

CN 117746765 A 3/2024
TW 202111677 A 3/2021

(Continued)

*Primary Examiner* — Ke Xiao
*Assistant Examiner* — Nelson Lam
(74) *Attorney, Agent, or Firm* — CKC & Partners Co., LLC

(57) ABSTRACT

A control method includes following operations: outputting a first control signal to a first switch coupled to a first sub-pixel of a display panel; outputting a second control signal to a second switch coupled to a second sub-pixel of the display panel; and outputting a driving voltage of display data according to a data output enable signal. The data output enable signal has a plurality of pulses, and a first time interval between a first pulse of the plurality of pulses and a second pulse of the plurality of pulses is shorter than a second time interval between the second pulse of the plurality of pulses and a third pulse of the plurality of pulses.

13 Claims, 7 Drawing Sheets

(58) Field of Classification Search
CPC .... G09G 3/3625; G09G 3/364; G09G 3/3655; G09G 3/3659; G09G 3/3666; G09G 3/3674; G09G 3/3677; G09G 3/3681; G09G 3/3685; G09G 3/3688; G09G 3/3692; G09G 3/3696
USPC ........................................ 345/76–83, 87–104
See application file for complete search history.

(56) References Cited

U.S. PATENT DOCUMENTS

| | | | | |
|---|---|---|---|---|
| 2012/0169697 | A1* | 7/2012 | Chang | G09G 3/3648 345/211 |
| 2014/0198135 | A1* | 7/2014 | Eom | G09G 3/3275 345/82 |
| 2015/0015563 | A1* | 1/2015 | Leonid | G09G 3/3233 345/212 |
| 2016/0322008 | A1* | 11/2016 | Sang | G09G 3/3688 |
| 2019/0005889 | A1* | 1/2019 | Kwon | G09G 3/30 |
| 2019/0251930 | A1* | 8/2019 | Yang | G09G 5/10 |
| 2019/0347976 | A1* | 11/2019 | Um | G09G 3/2074 |
| 2020/0184895 | A1* | 6/2020 | Zhao | G09G 3/2074 |
| 2021/0366343 | A1 | 11/2021 | Oh et al. | |
| 2022/0262320 | A1* | 8/2022 | Chang | G09G 3/3291 |
| 2022/0406262 | A1* | 12/2022 | Toyomura | G09G 3/3266 |
| 2023/0018362 | A1* | 1/2023 | Park | G09G 3/3241 |

FOREIGN PATENT DOCUMENTS

| | | | |
|---|---|---|---|
| TW | 202137180 | A | 10/2021 |
| TW | 202305774 | A | 2/2023 |

* cited by examiner

METHOD OF CONTROLLING DISPLAY DRIVER TOTAL CHARGING TIME LENGTH OF SUB-PIXELS TO IMPROVE BRIGHT-DARK LINE ISSUES

RELATED APPLICATIONS

This application claims priority to U.S. Provisional Application Ser. No. 63/713,055, filed Oct. 29, 2024, which is herein incorporated by reference.

BACKGROUND

Technical Field

The present disclosure relates to display technology. More particularly, the present disclosure relates to a control method of a display driver.

Description of Related Art

With developments of technology, display devices are applied to various electronic devices. In general, a display device includes a display driver and a display panel. The display driver can charge sub-pixels in the display panel according to display data such that the display panel displays corresponding images. In some related approaches, total charging time lengths of different sub-pixels are drastically different. For example, a total charging time length of one sub-pixel may be only or less than a half of a total charging time length of another sub-pixel. It causes this another sub-pixel undercharged and causes bright-dark lines issues.

SUMMARY

Some aspects of the present disclosure are to a control method of a display driver. The control method includes following operations: outputting a first control signal to a first switch coupled to a first sub-pixel of a display panel; outputting a second control signal to a second switch coupled to a second sub-pixel of the display panel; and outputting a driving voltage of display data according to a data output enable signal. The data output enable signal has a plurality of pulses, and a first time interval between a first pulse of the plurality of pulses and a second pulse of the plurality of pulses is shorter than a second time interval between the second pulse of the plurality of pulses and a third pulse of the plurality of pulses.

Some aspects of the present disclosure are to a control method of a display driver. The control method includes following operations: outputting a first control signal to a first switch coupled to a first sub-pixel of a display panel; outputting a second control signal to a second switch coupled to a second sub-pixel of the display panel; and outputting a driving voltage of display data. The driving voltage includes a first driving voltage and a second driving voltage, and the display data includes first display data and second display data. A first period of the first driving voltage of the first display data is shorter than a second period of the second driving voltage of the second display data.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
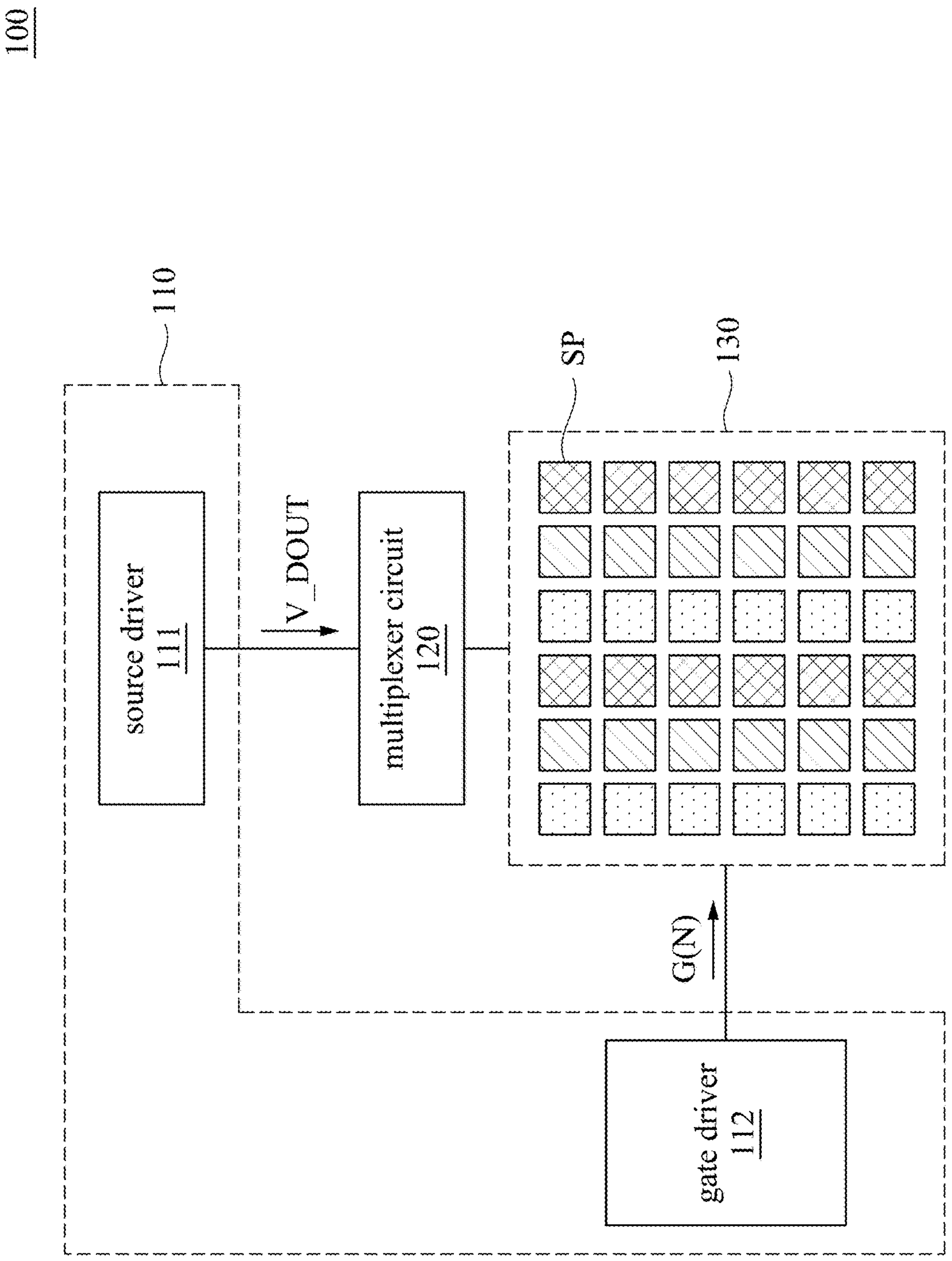
FIG. 1 is a schematic diagram illustrating a display device according to some embodiments of the present disclosure.

Reference is made to FIG. 1. FIG. 1 is a schematic diagram illustrating a display device 100 according to some embodiments of the present disclosure.

As illustrated in FIG. 1, the display device 100 includes a display driver 110, a multiplexer circuit 120, and a display panel 130. The display driver 110 is coupled to the multiplexer circuit 120 and the display panel 130. The multiplexer circuit 120 is coupled to the display panel 130.

The display driver 110 includes a source driver 111 and a gate driver 112. The display panel 130 includes multiple sub-pixels SP. These sub-pixels SP include red sub-pixels, green sub-pixels, and blue sub-pixels. The source driver 111 is configured to output a driving voltage V_DOUT of display data to the sub-pixels SP in the display panel 130 through the multiplexer circuit 120. The gate driver 112 is configured to output gate line signals G(N) to gate lines in the display panel 130. The gate lines are coupled to the sub-pixels SP. Thus, the sub-pixels SP display corresponding colors with corresponding brightness according to the driving voltage V_DOUT and the gate line signals G(N).

Figure 2:
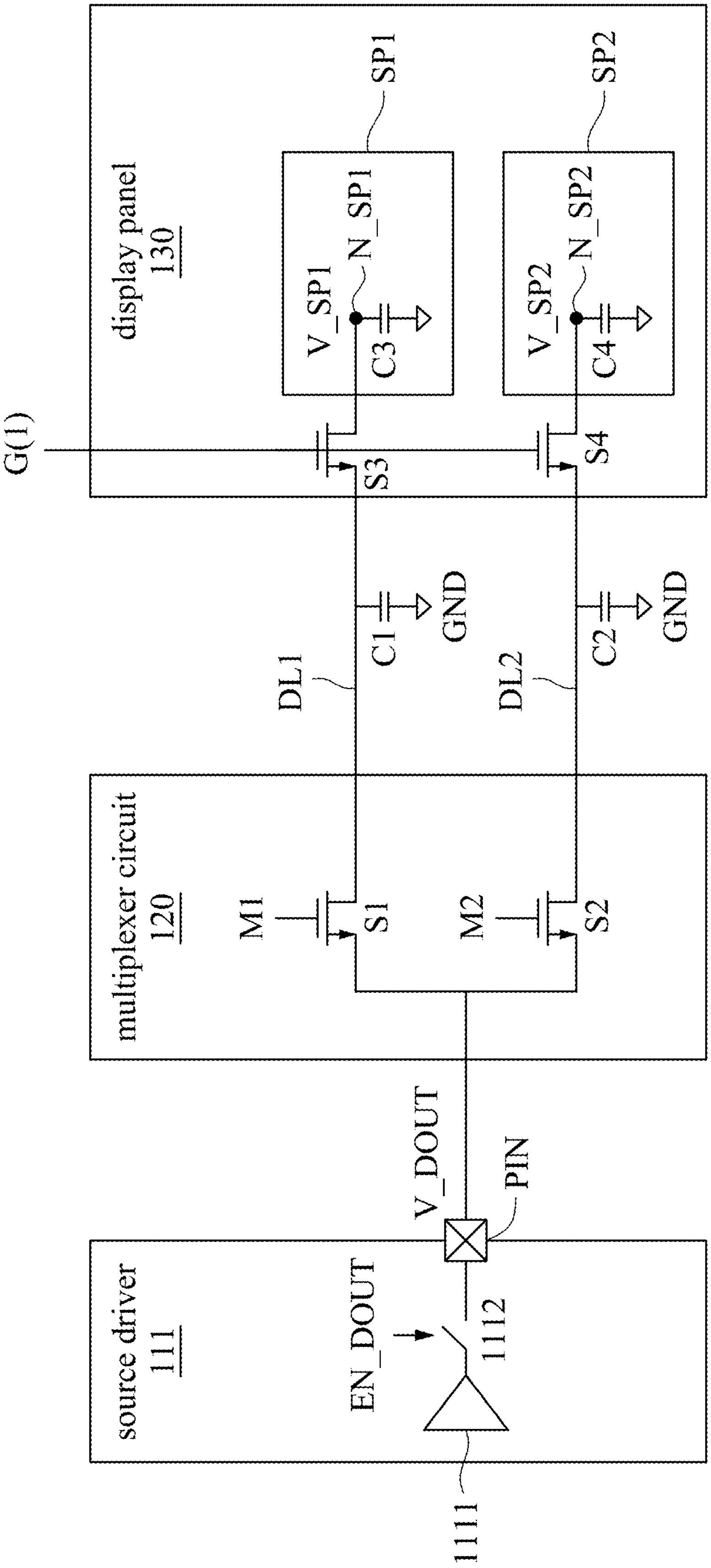
FIG. 2 is a schematic diagram illustrating a source driver, a multiplexer circuit, and the display panel in FIG. 1 according to some embodiments of the present disclosure.

Reference is made to FIG. 2. FIG. 2 is a schematic diagram illustrating the source driver 111, the multiplexer circuit 120, and the display panel 130 in FIG. 1 according to some embodiments of the present disclosure.

As illustrated in FIG. 2, the source driver 111 outputs the driving voltage V_DOUT of the display data according to a data output enable signal EN_DOUT. To be more specific, the source driver 111 includes a buffer 1111 and a switch 1112. The buffer 1111 is coupled to the switch 1112. The switch 1112 is controlled to be turned on or turned off by the data output enable signal EN_DOUT. For example, the switch 1112 is turned on in response to a falling edge of the data output enable signal EN_DOUT, and the switch 1112 is turned off in response to a rising edge of the data output enable signal EN_DOUT. When the switch 1112 is turned on by the data output enable signal EN_DOUT, the driving voltage V_DOUT of the display data is outputted to the multiplexer circuit 120 through a driving pin PIN.

The multiplexer circuit 120 includes the switches S1-S2. In FIG. 2, the switches S1-S2 are implemented by n-type switches. The switch S1 is coupled to a sub-pixel SP1, and the switch S2 is coupled to a sub-pixel SP2. The display driver 110 in FIG. 1 can output a control signal M1 to a gate terminal of the switch S1 to control the switch S1 to be turned on or turned off, and output a control signal M2 to a gate terminal of the switch S2 to control the switch S2 to be turned on or turned off. In some embodiments, the control signal M1 and the control signal M2 are outputted from the source driver 111 in the display driver 110. In some embodiments, the control signal M1 and the control signal M2 are outputted from the gate driver 112 in the display driver 110.

Although FIG. 2 illustrates the multiplexer circuit 120 with the two switches S1-S2 and the switches S1-S2 are configured to charge corresponding two sub-pixels SP1-SP2 respectively, the present disclosure is not limited thereto. In some other embodiments, the multiplexer circuit 120 can include three or more switches to charge three or more sub-pixels respectively.

The display panel 130 includes switches S3-S4 and the sub-pixels SP1-SP2. In FIG. 2, the switches S3-S4 are implemented by n-type switches. The switch S3 is coupled between the switch S1 and the sub-pixel SP1, and the switch S4 is coupled between the switch S2 and the sub-pixel SP2. A data line DL1 is coupled between the switch S1 and the switch S3, and a data line DL2 is coupled between the switch S2 and the switch S4. There is a corresponding data line impedance on the data line DL1, and there is a corresponding data line impedance on the data line DL2. A capacitor C1 is coupled between the data line DL1 and a ground terminal GND, and a capacitor C2 is coupled between the data line DL2 and a ground terminal GND. The gate driver 112 in the display driver 110 in FIG. 1 can output a gate line signal G(1) to a gate terminal of the switch S3 to control the switch S3 to be turned on or turned off, and output the gate line signal G(1) to a gate terminal of the switch S4 to control the switch S4 to be turned on or turned off. The capacitor C3 is coupled between a sub-pixel node N_SP1 and the ground terminal GND, and the capacitor C4 is coupled between a sub-pixel node N_SP2 and the ground terminal GND. There is a corresponding sub-pixel impedance between the switch S3 and the sub-pixel node N_SP1, and there is a corresponding sub-pixel impedance between the switch S4 and the sub-pixel node N_SP2.

Figure 3:
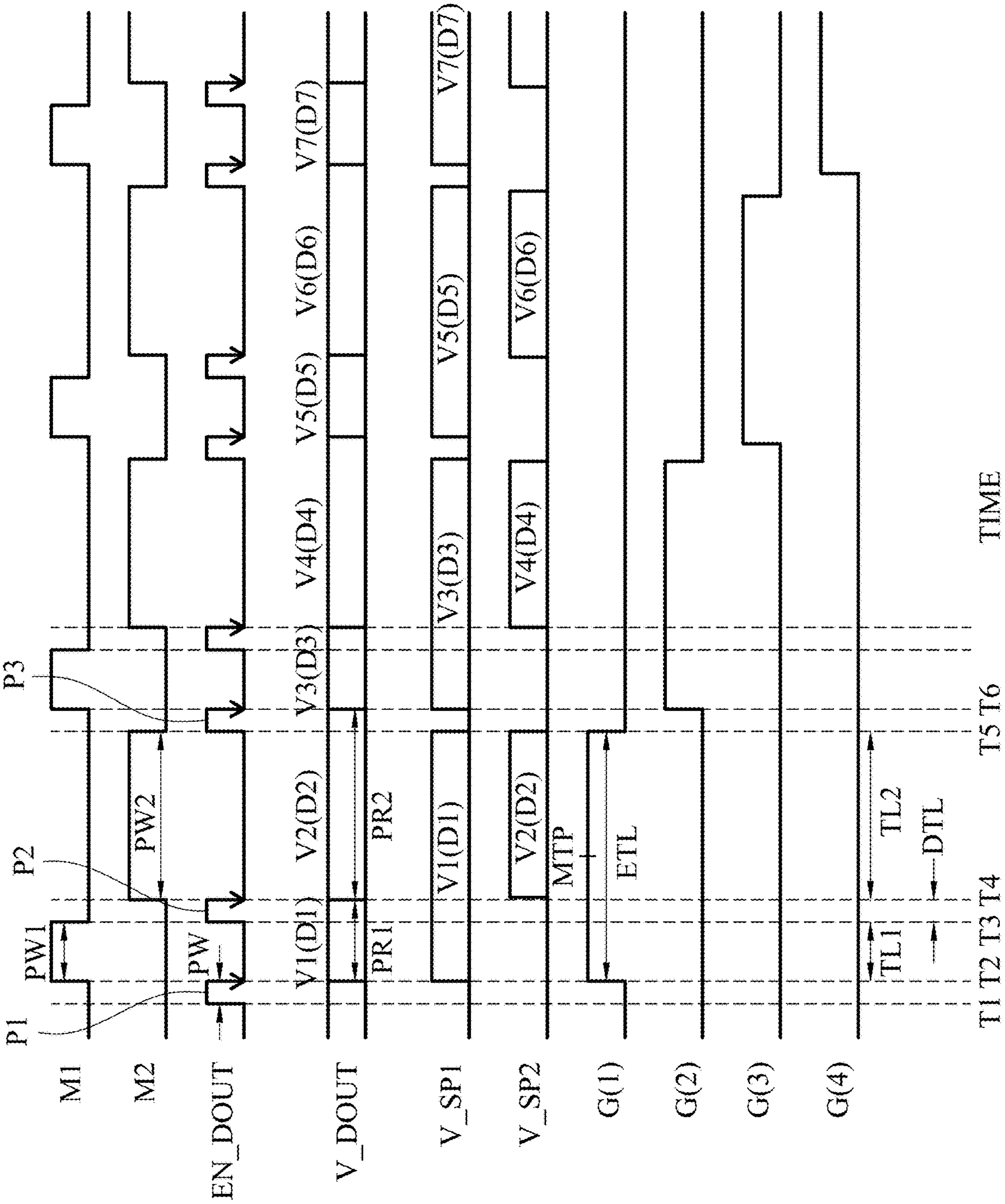
FIG. 3 is a waveform diagram illustrating a plurality of signals according to some embodiments of the present disclosure.

References are made to FIG. 2 and FIG. 3. FIG. 3 is a waveform diagram illustrating a plurality of signals according to some embodiments of the present disclosure.

As described above, the source driver 111 can output the driving voltage V_DOUT of the display data according to the data output enable signal EN_DOUT.

First, as illustrated in FIG. 3, the driving voltage V_DOUT includes a driving voltage V1 of display data D1, a driving voltage V2 of display data D2, a driving voltage V3 of display data D3, a driving voltage V4 of display data D4, a driving voltage V5 of display data D5, a driving voltage V6 of display data D6, and a driving voltage V7 of display data D7. For better understanding, the driving voltages V1-V7 of the display data D1-D7 are illustrated to be with a same voltage value, but the present disclosure is not limited thereto. In practical applications, each of the driving voltages V1-V7 is an analog signal.

In addition, the data output enable signal EN_DOUT has multiple pulses, and these pulses have a same pulse width PW. To be more specific, the data output enable signal EN_DOUT has a pulse P1, a pulse P2, a pulse P3, and other pulses, and the pulse P1, the pulse P2, the pulse P3, and other pulses have the same pulse width PW. There is a time interval TL1 between the pulse P1 and the pulse P2. There is a time interval TL2 between the pulse P2 and the pulse P3. In the present disclosure, the time interval TL1 is shorter than the time interval TL2.

Details about the waveform diagram in FIG. 3 are described in following paragraphs with reference to FIG. 2.

At a time point T1, the data output enable signal EN_DOUT changes from a low voltage level to a high voltage level (i.e., a rising edge of the pulse P1).

At a time point T2, the control signal M1 changes from the low voltage level to the high voltage level (i.e., a rising edge of the control signal M1). The data output enable signal EN_DOUT changes from the high voltage level to the low voltage level (i.e., a falling edge of the pulse P1). A time length between the time point T1 and the time point T2 equals to the pulse width PW of the pulse P1. As described above, the switch 1112 is turned on in response to the falling edge of the data output enable signal EN_DOUT. Thus, the switch 1112 is turned on by the falling edge of the pulse P1 to output the driving voltage V_DOUT (i.e., the driving voltage V1 of the display data D1). In addition, the gate line signal G(1) changes from the low logic level to the high logic level.

Figure 4:
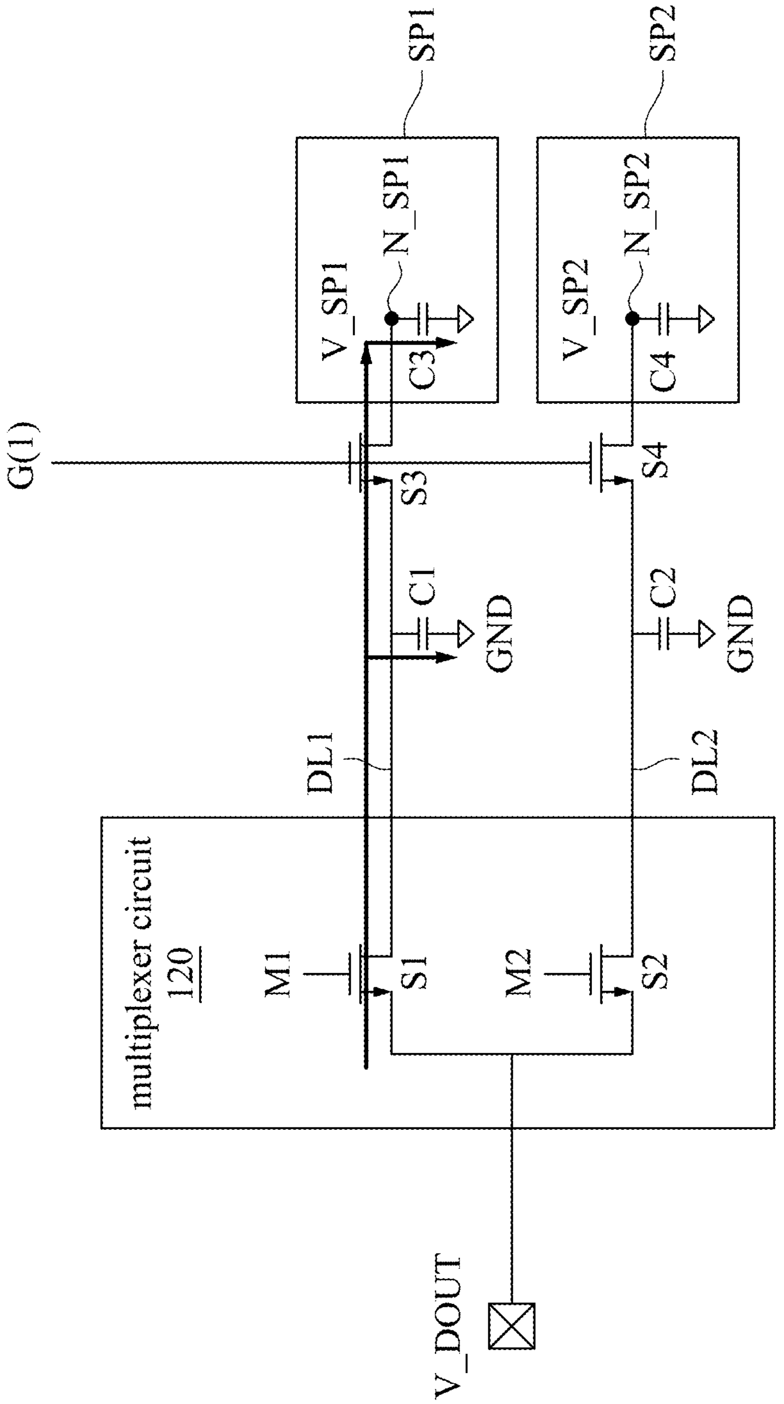
FIG. 4 is schematic diagram illustrating operation of FIG. 2 in a time interval according to some embodiments of the present disclosure.

References are made to FIG. 3 and FIG. 4. FIG. 4 is schematic diagram illustrating operation of FIG. 2 in the time interval TL1 according to some embodiments of the present disclosure.

During the time interval TL1 (i.e., from the time point T2 to a time point T3), the control signal M1 has the high voltage level and the control signal M2 has the low voltage level. Accordingly, the switch S1 is turned on by the control signal M1 and the switch S2 is turned off by the control signal M2. In addition, since the gate line signal G(1) has the high voltage level, the switch S3 and the switch S4 are turned on by the gate line signal G(1). Thus, as illustrated in FIG. 4, the driving voltage V_DOUT (i.e., the driving voltage V1 of the display data D1) charges the capacitor C1 through the turned-on switch S1 and then charges the capacitor C3 through the turned-on switch S3. The sub-pixel node N_SP1 is charged to a sub-pixel voltage V_SP1 according to the driving voltage V_DOUT (i.e., the driving voltage V1 of the display data D1).

At the time point T3, the control signal M1 changes from the high voltage level to the low voltage level (i.e., a falling edge of the control signal M1). The data output enable signal EN_DOUT changes from the low voltage level to the high voltage level (i.e., a rising edge of the pulse P2). In other words, the rising edge of the pulse P2 of the data output enable signal EN_DOUT is aligned with the falling edge of the control signal M1.

Figure 5:
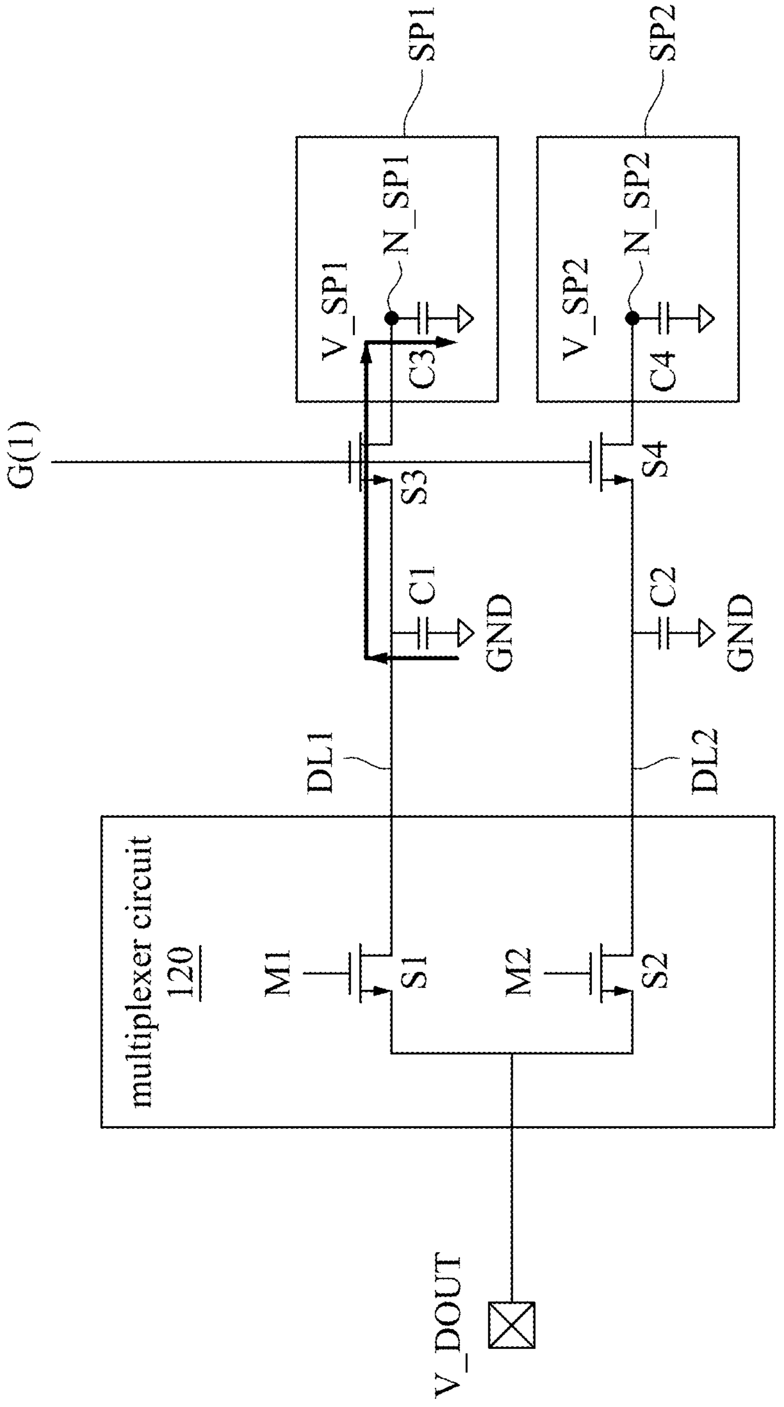
FIG. 5 is schematic diagram illustrating operation of FIG. 2 in a delay time interval according to some embodiments of the present disclosure.

References are made to FIG. 3 and FIG. 5. FIG. 5 is schematic diagram illustrating operation of FIG. 2 in a delay time interval DTL according to some embodiments of the present disclosure.

During the delay time interval DTL (i.e., from the time point T3 to a time point T4), the control signal M1 and the control signal M2 have the low voltage level. Accordingly, the switch S1 is turned off by the control signal M1 and the switch S2 is turned off by the control signal M2. In addition, since the gate line signal G(1) still has the high voltage level, the switch S3 and the switch S4 are still turned on by the gate line signal G(1). Thus, as illustrated in FIG. 5, charges stored on the capacitor C1 still charges the capacitor C3 through the turned-on switch S3.

At the time point T4, the control signal M2 changes from the low voltage level to the high voltage level (i.e., a rising edge of the control signal M2). In FIG. 3, the delay time interval DTL between the falling edge of the control signal M1 and the rising edge of the control signal M2 is shorter than the time interval TL1. In addition, the data output enable signal EN_DOUT changes from the high voltage level to the low voltage level (i.e., a falling edge of the pulse P2). In other words, the falling edge of the pulse P2 of the data output enable signal EN_DOUT is aligned with the rising edge of the control signal M2. As described above, the switch 1112 is turned on in response to the falling edge of the data output enable signal EN_DOUT. Thus, the switch 1112 is turned on by the falling edge of the pulse P2 to output the driving voltage V_DOUT (i.e., the driving voltage V2 of the display data D2).

Figure 6:
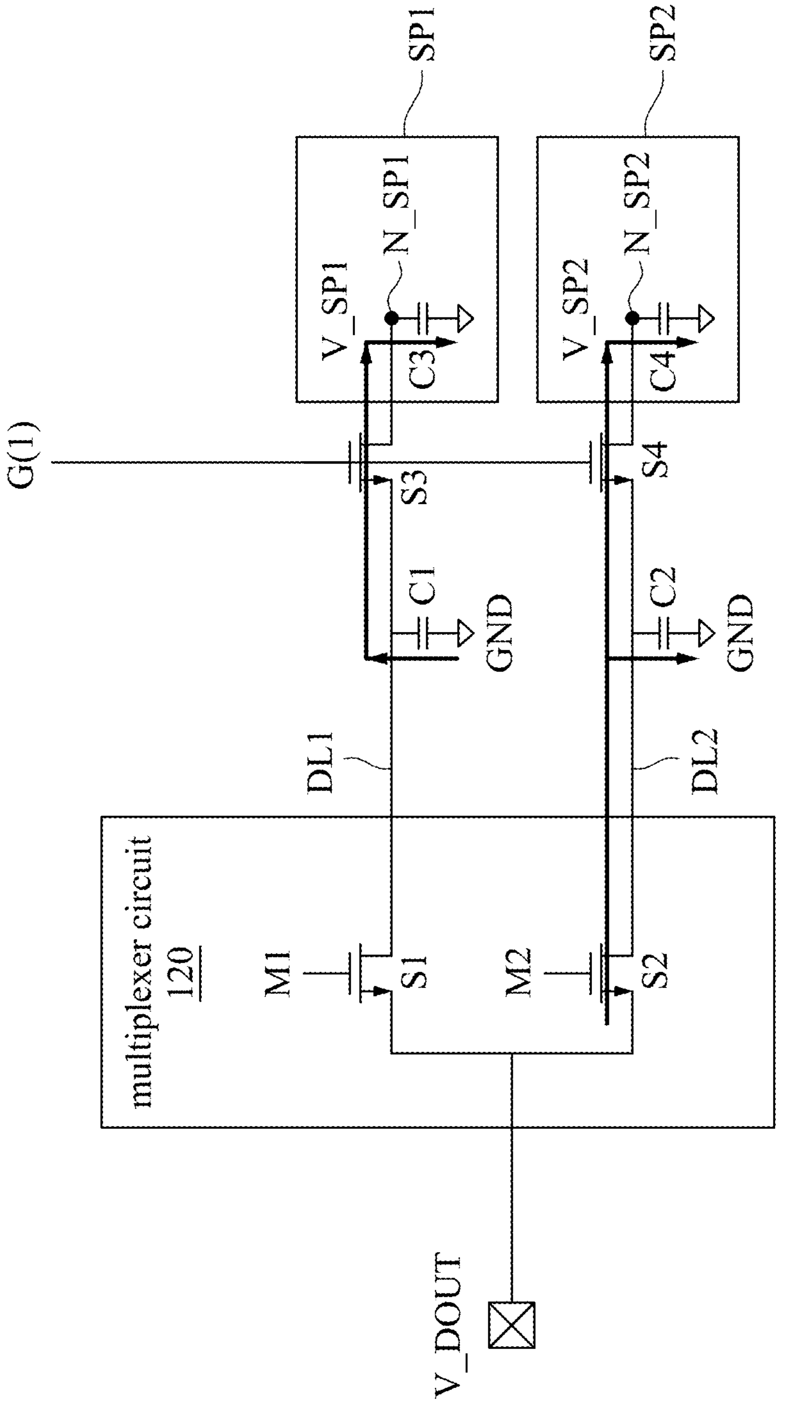
FIG. 6 is schematic diagram illustrating operation of FIG. 2 in a time interval according to some embodiments of the present disclosure.

References are made to FIG. 3 and FIG. 6. FIG. 6 is schematic diagram illustrating operation of FIG. 2 in the time interval TL2 according to some embodiments of the present disclosure.

During the time interval TL2 (i.e., from the time point T4 to a time point T5), the control signal M1 has the low voltage level and the control signal M2 has the high voltage level. Accordingly, the switch S1 is turned off by the control signal M1 and the switch S2 is turned on by the control signal M2. In addition, since the gate line signal G(1) still has the high voltage level, the switch S3 and the switch S4 are still turned on by the gate line signal G(1). Thus, as illustrated in FIG. 6, charges stored on the capacitor C1 still charges the capacitor C3 through the turned-on switch S3, and the driving voltage V_DOUT (i.e., the driving voltage V2 of the display data D2) charges the capacitor C2 through the turned-on switch S2 and then charges the capacitor C4 through the turned-on switch S4. The sub-pixel node N_SP2 is charged to a sub-pixel voltage V_SP2 according to the driving voltage V_DOUT (i.e., the driving voltage V2 of the display data D2).

At the time point T5, the control signal M2 changes from the high voltage level to the low voltage level (i.e., a falling edge of the control signal M2). The data output enable signal EN_DOUT changes from the low voltage level to the high voltage level (i.e., a rising edge of the pulse P3). The gate line signal G(1) changes from the high logic level to the low logic level. An enable time interval ETL of the gate line signal G(1) is from the time point T2 to the time point T5.

At a time point T6, the data output enable signal EN_DOUT changes from the high voltage level to the low voltage level (i.e., a falling edge of the pulse P3). As described above, the switch 1112 is turned on in response to the falling edge of the data output enable signal EN_DOUT. Thus, the switch 1112 is turned on by the falling edge of the pulse P3 to output the driving voltage V_DOUT (i.e., the driving voltage V3 of the display data D3).

Since the subsequent display data D3-D7 and other gate line signals G(2), G(3), and G(4) are with similar operation principles, they are not described herein again.

As illustrated in FIG. 4, FIG. 5, and FIG. 6, the sub-pixel SP1 is charged during the time interval TL1, the delay time DTL, and the time interval TL2. The sub-pixel SP2 is only charged during the time interval TL2.

In FIG. 3, as described above, the time interval TL1 is shorter than the time interval TL2. As illustrated in FIG. 3, the delay time interval DTL (i.e., the pulse P2) is before a middle time point MTP of the enable time interval ETL of the gate line signal G(1). In other words, the starting time point T4 of the time interval TL2 is also before the middle time point MTP of the enable time interval ETL of the gate line signal G(1). In addition, the rising edge of the control signal M2 is also before the middle time point MTP of the enable time interval ETL of the gate line signal G(1).

Furthermore, since a time length between the falling edge of the pulse P1 and the falling edge of the pulse P2 is shorter than a time length between the falling edge of the pulse P2 and the falling edge of the pulse P3, a period PR1 of the driving voltage V1 of the display data D1 is shorter than a period PR2 of the driving voltage V2 of the display data D2. To be more specific, the period PR1 of the driving voltage V1 of the display data D1 equals to a sum of the pulse width PW1 of the control signal M1 and the pulse width PW of the pulse P2 in the data output enable signal EN_DOUT. The period PR2 of the driving voltage V2 of the display data D2 equals to a sum of the pulse width PW2 of the control signal M2 and the pulse width PW of the pulse P3 in the data output enable signal EN_DOUT. The starting time point T4 of the period PR2 is also before the middle time point MTP of the enable time interval ETL of the gate line signal G(1).

In some related approaches, total charging time lengths of different sub-pixels are drastically different. For example, a total charging time length of one sub-pixel may be only or less than a half of a total charging time length of another sub-pixel. It causes this another sub-pixel undercharged and causes bright-dark lines issues.

Compared to the related approaches above, in the present disclosure, the time interval TL1 is designed to be shorter than the time interval TL2. Only the sub-pixel SP1 is charged during the time interval TL1. Thus, a total charging time length of the sub-pixel SP2 is closer to the total charging time length of the sub-pixel SP1. For example, the total charging time length of the sub-pixel SP2 is more than the half of the total charging time length of the sub-pixel SP1. It can improve the bright-dark lines issues.

It is noted that the voltage levels of the control signals M1-M2 and the gate line signal G(1) in FIG. 3 are designed according to types of the switches S1-S4 in FIG. 2. In some other embodiments, when the switches S1-S4 in FIG. 2 are implemented by p-type switches, the high voltage levels of the control signals M1-M2 and the gate line signal G(1) in FIG. 3 are changed to be the low voltage levels to turn on the switches S1-S4.

Figure 7:
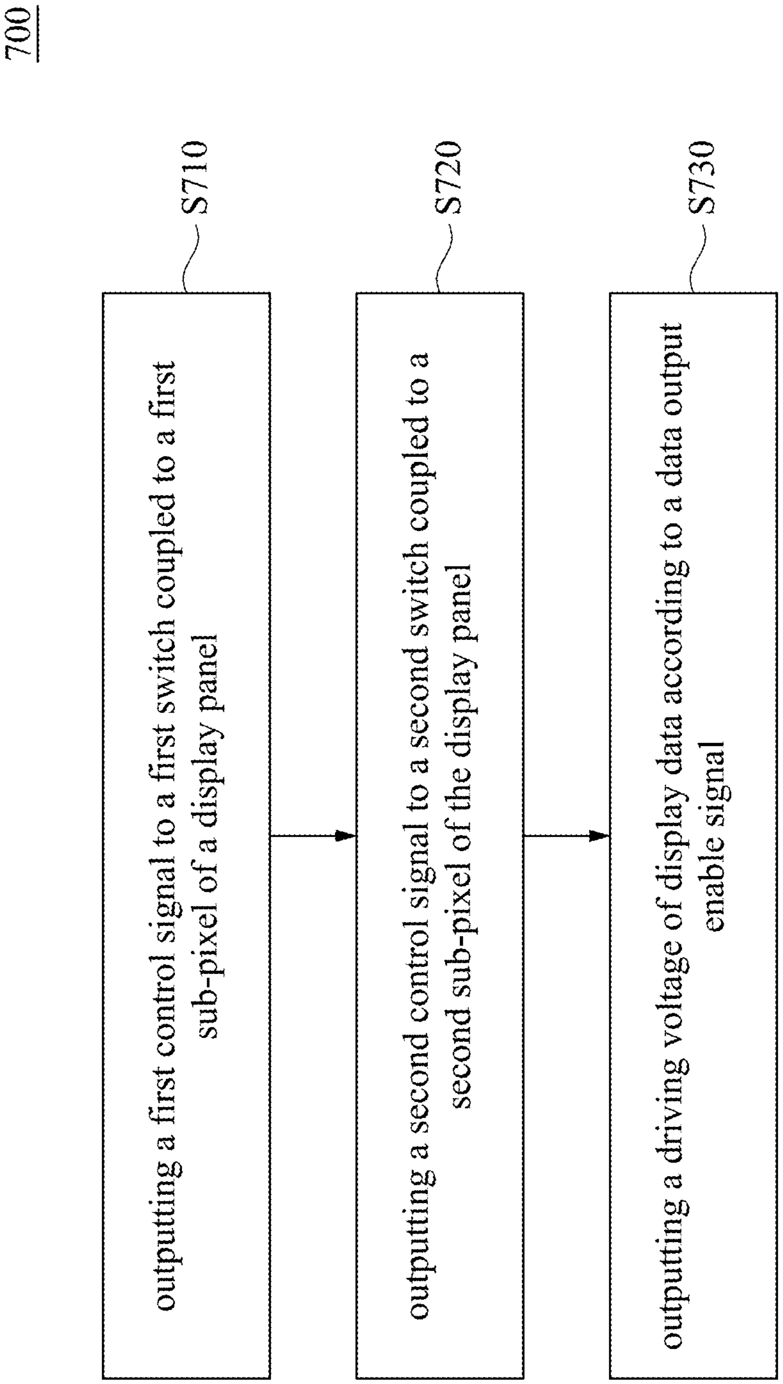
FIG. 7 is a flow diagram illustrating a control method of a display driver according to some embodiments of the present disclosure.

Reference is made to FIG. 7. FIG. 7 is a flow diagram illustrating a control method 700 of a display driver according to some embodiments of the present disclosure.

In some embodiments, the control method 700 can be applied to the display driver 110 in FIG. 1, but the present disclosure is not limited thereto. For better understanding, the control method 700 is described with reference to FIG. 1 and FIG. 2 in following paragraphs.

As illustrated in FIG. 7, the control method 700 includes operation S710, S720, and operation S730.

In operation S710, the display driver 110 outputs the control signal M1 to the switch S1 coupled to the sub-pixel SP1 of the display panel 130.

In operation S720, the display driver 110 outputs the control signal M2 to the switch S2 coupled to the sub-pixel SP2 of the display panel 130.

In operation S730, the display driver 110 outputs the driving voltage V_DOUT of the display data (i.e., the driving voltages V1-V7 of the display data D1-D7) according to the data output enable signal EN_DOUT.

Details about these operations above are described in aforementioned embodiments, so they are not described herein again.

Based on the descriptions above, in the present disclosure, the total charging time length of another sub-pixel is closer to the total charging time length of the one sub-pixel. It can improve the bright-dark lines issues.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A control method of a display driver, comprising:

outputting a first control signal to a first switch coupled to a first sub-pixel of a display panel;

outputting a second control signal to a second switch coupled to a second sub-pixel of the display panel; and outputting a driving voltage of a display data according to a data output enable signal, wherein the data output enable signal is configured to control an output switch which is comprised in a source driver and coupled to the first switch and the second switch, wherein the data output enable signal comprises a plurality of pulses, and a first time interval between a first pulse of the plurality of pulses and a second pulse of the plurality of pulses is shorter than a second time interval between the second pulse of the plurality of pulses and a third pulse of the plurality of pulses, wherein a rising edge of the second pulse is aligned with a falling edge of the first control signal.

2. The control method of the display driver of claim 1, wherein a falling edge of the second pulse is aligned with a rising edge of the second control signal.

3. The control method of the display driver of claim 1, wherein a delay time interval between the falling edge of the first control signal and a rising edge of the second control signal is shorter than the first time interval.

4. The control method of the display driver of claim 1, wherein each of the first pulse and the second pulse has a same pulse width.

5. The control method of the display driver of claim 1, wherein the first switch is turned on by the first control signal during the first time interval, and the second switch is turned on by the second control signal during the second time interval.

6. The control method of the display driver of claim 1, further comprising:

outputting a gate line signal to a third switch coupled between the first switch and the first sub-pixel; and outputting the gate line signal to a fourth switch coupled between the second switch and the second sub-pixel.

7. The control method of the display driver of claim 6, wherein the second pulse is before a middle time point of an enable time interval of the gate line signal.

8. The control method of the display driver of claim 6, wherein a starting time point of the second time interval is before a middle time point of an enable time interval of the gate line signal.

9. A control method of a display driver, comprising:

outputting a first control signal to a first switch coupled to a first sub-pixel of a display panel;

outputting a second control signal to a second switch coupled to a second sub-pixel of the display panel; and outputting a driving voltage of a display data, wherein the driving voltage is outputted through the first switch and the second switch to the first sub-pixel and the second sub-pixel, wherein the driving voltage comprises a first driving voltage and a second driving voltage, and the display data comprises a first display data and a second display data, wherein a first period of the first driving voltage of the first display data is shorter than a second period of the second driving voltage of the second display data, wherein the first period equals to a first sum of a first pulse width of the first control signal and a second pulse width of a data output enable signal.

10. The control method of the display driver of claim 9, wherein the second period equals to a second sum of a third pulse width of the second control signal and the second pulse width of the data output enable signal.

11. The control method of the display driver of claim 9, further comprising:

outputting a gate line signal to a third switch coupled between the first switch and the first sub-pixel; and outputting the gate line signal to a fourth switch coupled between the second switch and the second sub-pixel.

12. The control method of the display driver of claim 11, wherein a starting time point of the second period is before a middle time point of an enable time interval of the gate line signal.

13. The control method of the display driver of claim 11, wherein a rising edge of the second control signal is before a middle time point of an enable time interval of the gate line signal.

* * * * *